US006079401A

United States Patent [19]

Alvord et al.

[11] Patent Number: 6,079,401

[45] Date of Patent: Jun. 27, 2000

[54] SINGLE KNOB ROTARY OVEN CONTROL APPARATUS PROVIDING CONTINUOUS AND DISCRETE CONTROL INFORMATION

[75] Inventors: Robert J. Alvord, Elmwood Park; Jeffery M. Huffington, Geneva; Thomas F. Glennon, Darien; Larry Motyka, Batavia, all of Ill.

[73] Assignee: Ranco Incorporated of Delaware, Wilmington, Del.

[21] Appl. No.: 09/208,940

[22] Filed: Dec. 10, 1998

[51] Int. Cl.[7] .............................. F24C 3/00; A21B 1/00; H01C 10/00; H01H 19/00

[52] U.S. Cl. .............................. 126/39 G; 126/39 BA; 219/398; 338/196; 338/172; 338/201; 338/215; 200/6 B; 200/18; 200/574

[58] Field of Search .............................. 338/196, 198, 338/172, 201, 200, 215; 200/6 B, 573, 18, 574; 219/398, 509; 126/39 BA, 39 G

[56] References Cited

U.S. PATENT DOCUMENTS

| | | | |
|---|---|---|---|
| 2,747,073 | 5/1956 | Welch et al. | 219/398 |
| 2,824,941 | 2/1958 | Fry | 219/452 |
| 2,935,591 | 5/1960 | Lee | 219/398 |
| 2,970,199 | 1/1961 | Dull et al. | 219/398 |
| 3,093,722 | 6/1963 | Schauer, Jr. | 219/398 |
| 3,214,539 | 10/1965 | Glaberson et al. | 219/398 |
| 3,748,627 | 7/1973 | Zdanys, Jr. | 338/20 |
| 3,840,838 | 10/1974 | JA et al. | 338/200 |
| 3,952,278 | 4/1976 | Kiyono | 338/172 |
| 4,081,782 | 3/1978 | Hildreth et al. | 338/200 |
| 4,316,079 | 2/1982 | Schmitz | 219/398 |
| 5,150,095 | 9/1992 | Jones | 338/200 |
| 5,264,821 | 11/1993 | Vultaggio et al. | 338/172 |
| 5,493,478 | 2/1996 | Tyneski et al. | 200/8 R |
| 5,662,465 | 9/1997 | Kano | 431/12 |
| 5,668,359 | 9/1997 | Alvord et al. | 200/6 B |

FOREIGN PATENT DOCUMENTS

| | | | |
|---|---|---|---|
| 2746841 | 4/1979 | Germany | 338/198 |

*Primary Examiner*—Ira S. Lazarus
*Assistant Examiner*—David Lee
*Attorney, Agent, or Firm*—Terrence Martin; J. J. Morris; Sean D. Detweiler

[57] ABSTRACT

In an appliance such as an oven for cooking food, the invention contemplates a user rotatable, single knob oven control device which provides both discrete and continuous control signals to the appliance controller. The discrete outputs indicate selection of oven features, and the continuous output the desired baking temperature. These inputs are selected by a user in response to rotation of a user interface knob mounted on a control panel. The control panel provides visual indication of oven cooking temperature selections through a first arc around the knob, and user selectable oven features (such as, e.g., OFF/CANCEL, BROIL, and CLEAN) in a second arc around the knob. The control device comprises a hub having a portion adapted to be drivably coupled to the user interface knob. The hub also includes a flange which has at least one cam. The device also includes a variable resistance element having a rotatable shaft in driving engagement with the hub. This element provides a variable resistance output in response to rotation of the shaft through the first arc. Additionally, the device includes a push button switch which is located external to the variable resistance element. The switch is also located in proximity with the flange such that rotation of the hub will bring the cam in contact with the switch to actuate it. This switch provides a discrete output when actuated by the cam to indicate a selection of one of the oven features.

25 Claims, 10 Drawing Sheets

SINGLE KNOB ROTARY OVEN CONTROL APPARATUS PROVIDING CONTINUOUS AND DISCRETE CONTROL INFORMATION

FIELD OF THE INVENTION

The instant invention relates to appliance controls, and more particularly to temperature and mode selection control devices for an oven.

BACKGROUND OF THE INVENTION

Consumer appliances, such as refrigerators and stoves, have become a mainstay in nearly every American home. Continued advances in these appliances have resulted in the addition of many new features and functions. These new features and functions have increased both the efficiency and the reliability of the appliance, and have reduced the cost and time required to maintain and clean the appliance. One prime example of an appliance which has benefited from the continued advances in the consumer appliance industry is the stove. A modern stove now typically includes a warming feature, a broil feature, as well as a self-cleaning feature (a particularly time saving and desired feature). In addition to these new features, typical stoves still include a user selectable temperature setting which allows the baking of various dishes at various temperature settings. The continuously adjustable temperature setting allows the user to tailor the cook temperature to suit their desires and preferences, and the varying requirements of different recipes.

In the past, oven controls were primarily mechanical in nature. These early mechanical controls utilized a variable port gas valve which varied the amount of gaseous fuel delivered through the variable port to the oven burners in an attempt to regulate the temperature therein. Many advances have been made in the control of oven temperature and feature settings from these early mechanical control devices, including the utilization of electronic thermostatic control of the temperature within the oven compartment. Continued advances in the field of electronic controls have allowed further integration of control features, and have led to the single knob oven control. This single knob oven control, a front panel design of which is illustrated in FIG. 6 allows a user with a single rotary knob to select a particular cooking temperature by rotating the control knob until the indicator is pointing to the desired temperature as listed on the temperature scale 10 illustrated in FIG. 6. Additionally, this single rotary knob control allows the user to select the various functions, such as warm 12, clean 14, broil 16, or off 18 by simply rotating the control knob until the indicator points to the desired function. This single knob control has gained widespread acceptance, and is now quite popular.

These early electronic single knob controls typically utilized a potentiometer with internal switches such as is illustrated in FIG. 7. As this figure illustrates, the single knob oven control utilizes an integrated electrical circuit comprising a linear tapped potentiometer 20 and a series of internally positioned electrical contacts 22, 24, 26, and 28. Each of these electrical contacts form one side of a switch which, depending on the position of the rotary control knob (not shown), would establish connections between two of these electrical contacts (e.g., electrical contact 22 and electrical contact 24) to initiate a given feature of the oven (e.g., the broil feature).

While these single knob oven controls have gained widespread acceptance and consumer preference throughout the industry, the accuracy of operation of these early controls were somewhat limited. Specifically, and with continuing reference to FIG. 7, the nature of the slide type electrical contacts 22–28 require that a certain angular tolerance of between 18°–20° be provided to ensure that the proper feature was selected when the control knob was positioned to select that particular feature. Safety requirements dictated that the spacing between each of the feature selectable electrical contacts be in the range of 20°–25° to ensure "break-before-make" switching between features and to ensure that an improperly positioned control knob would not inadvertently or alternatively select multiple features. Unfortunately, these requirements for the electrical contacts 22–28 severely limited the angular range, and therefore the accuracy, of the temperature selecting portion of the potentiometer. Specifically, as illustrated in FIG. 7, the inclusion of three functions (broil, clean, and off) reduces the available angle for the potentiometer (used to select the cooking temperature) to a mere 235° typically. The additional requirement of inter-functional spacing reduces the useful angular space of the potentiometer to only approximately 180° from the warm temperature setting to the 500° temperature setting.

This limitation on the useful resistance change versus the percentage travel around the knob is illustrated in FIG. 8. As may be seen from this figure, an ideal linearized potentiometer's resistance varies in accordance with line 30 from approximately 10° (3.6% of travel) to approximately 245° (68% of travel). However, as mentioned above, because of the inter-functional spacing requirements the actual useful variation of resistance is bound between the warm setting at line 32 and the 500° temperature limit illustrated by line 34. As mentioned above, this limitation on the useful rotation of the single control knob reduces the accuracy of the actual temperature selection for baking conditions. In other words, because of the limited angular travel available to select the various cooking temperatures, a very small resistance change relates to a very large temperature change in the cooking compartment. As a result, normal mechanical tolerances on the mounting of the control knob could result in an unacceptably large deviation from the selected temperature to the actual oven compartment temperature during different bake cycles.

Recognizing this limitation as a problem and an area for customer dissatisfaction, the assignee of the instant invention developed a second generation single knob oven control which greatly improved the accuracy of the temperature selection portion of the single knob control by increasing both the physical angular area of the variable resistance potentiometer and the actual useable area as well. Such a second generation single knob oven control is described in U.S. Pat. No. 5,662,465 entitled "Controlling Flow of Fuel Gas to a Burner", issued Sep. 2, 1997, to Yoshio Kano and assigned to the assignee of the instant application, the disclosure and teachings of which are hereby incorporated by reference. This second generation single knob control, a typical embodiment of which is illustrated in FIG. 9, increases the potentiometer area to approximately 280°. This second generation single knob oven control still utilizes the internal angularly positioned electrical contacts for selection of the various oven features. As discussed above, these angularly placed electrical contacts require a certain amount of angular tolerance to ensure proper initiation of each selected function, as well as a certain angular displacement between positions as described above. When these considerations are taken into account, the useable resistance variation for temperature control is reduced to approximately 265°. While this second generation single knob oven control is a significant improvement over its predecessor, the inventors of the instant application have continued to seek out continued areas of improvement. However, further improvement in the useable angular area of the potentiometer is limited by the safety requirements and necessary mechanical tolerances on the feature select electrodes which are integral therewith.

One method of increasing the useable variable resistance of a potentiometer is to exclude the ability to select the various cooking features from the single knob oven control. However, as will be recognized by one skilled in the art, such a removal requires the inclusion of either a second rotary knob to perform the feature selection function, or the inclusion of separate push buttons to effectuate the same selection. While these alternate designs are being sold on ovens (for example the Hotpoint brand oven, model no. RB532GON4AD, includes a temperature selection knob and a oven feature control knob having the discreet positions of OFF, BAKE, BROIL, and CLEAN). However, as will be recognized by one skilled in the art, such an arrangement requires that the user access two separate controls to perform the simple baking function. If the user forgets to actuate both control knobs (first selecting the desired baking temperature followed by selection on a separate control knob of the bake function), the meal may well be delayed until the situation is realized. Likewise, if the user forgets to turn both knobs to OFF, the oven may remain heated until this situation is realized. Since most Americans are familiar with and expect single knob control of an oven, such a compromise is not desired. However, this compromise has been necessary in order to gain increased accuracy of the temperature selection and control of the oven. Until now.

SUMMARY OF THE INVENTION

In view of the above, therefore, it is an object of the instant invention to overcome these and other problems existing in the art. More specifically, it is an object of the instant invention to provide a new and improved oven feature and temperature control device which utilizes only a single knob for both the selection of features and the variable selection of baking temperature. It is a further object of the instant invention to provide a single knob oven control which increases the accuracy of the temperature selection. It is a further object of the instant invention to utilize, to the maximum extent possible, the full variable resistance range of commercially available potentiometers.

In view of the above objects, it is a feature of the instant invention that the oven control device utilizes a single knob for the discreet selection of oven features and for the variable selection of bake temperatures. It is a further feature of the instant invention that all oven features and functions may be selected through a single rotary motion of the control knob to a desired position. Additionally, it is a feature of the instant invention that the selection of the discreet oven features does not require the use of conventional angularly placed electrical contacts.

In view of the above objects and features, it is an aspect of the instant invention that the single oven control knob utilizes a conventional, commercially available potentiometer to provide the variable resistance temperature selection function. It is a further aspect of the instant invention that separate discreet push button type switches be included to select the various cooking features of the oven. It is a further aspect of the instant invention that these discreet switches be selected by a cam located on a rotor hub actuated by the selector knob. An additional aspect of the instant invention is that the control knob utilizes a push to turn actuation mechanism. Further, it is an aspect of the instant invention that the rotor hub utilizes detents to positively select the various features of the oven.

In a preferred embodiment of the instant invention, an oven control apparatus which provides control inputs indicative of temperature and oven feature selection to an oven controller comprises a potentiometer having a shaft and at least a first and a second output terminal. The potentiometer provides a variable resistance between the output terminals in response to a rotation of the shaft through a first arc. The apparatus further comprises at least one switch positioned radially external to the potentiometer. Preferably, this switch is also positioned axially outside the first arc. The apparatus further comprises a hub having a flange and a portion in driving engagement with the shaft. The flange preferably has at least one cam positioned on it to actuate the switch upon rotation of the shaft to a given position.

Preferably, the apparatus of the instant invention further comprises a cover having an annular collar which accommodates the hub and includes a notch. The flange preferably includes at least one detent which is positioned such that upon rotary engagement with the notch, the cam is positioned to actuate the switch. Preferably, the apparatus includes at least two switches, and the cam is positioned to actuate each of the switches upon rotation of the shaft at a first and a second angular position outside the first arc. With these two switches, the flange preferably has formed therein at least two detents angularly positioned such that upon rotary engagement of each detent with the notch the cam is positioned to actuate one of the two switches. These two switches are preferably axially displaced one from another such that only one of the switches is actuated at any time by the cam. Alternatively, these two switches may be radially displaced one from another, and the cam actuates both of the switches. Further, the apparatus may include two cams positioned on the flange and radially displaced one from another in proportion to the radial spacing of the two switches such that a first cam actuates a first switch, and a second cam actuates a second switch.

In a preferred embodiment, the flange further comprises an axially extending projection which engages the notch to prevent rotation of the hub. In this embodiment, the shaft is outwardly spring biased to force the axially extending projection to engage this notch. The shaft may then be inwardly forced to disengage the axially extending projection from the notch to allow rotation of the hub. Alternatively, the apparatus includes a coil spring interposed between the potentiometer and the hub so that the spring outwardly biases the hub.

In a preferred embodiment, the first arc introduced above is defined by an angle greater than 280 degrees, and preferably by an angle in the range of 290 degrees to 310 degrees. All of the switches are positioned within a second arc defined by an angle of less than approximately 60 degrees +/−10 degrees, and preferably by an angle of less than approximately 30 degrees. Preferably, the apparatus comprising at least three switches positioned radially external to the potentiometer and within this second arc. In this embodiment, the cam is positioned to actuate each of the three switches upon rotation of the shaft at a first, a second, and a third angular position within the second arc. These switches are preferably discrete push-button type switches.

In an alternate embodiment of the instant invention, the potentiometer further comprises a tap terminal electrically coupled between the first and the second terminals. In this embodiment the potentiometer provides a variable resistance between the first terminal and the tap terminal in response to rotation of the shaft through a first portion of the first arc, and a variable resistance between the tap terminal and the second terminal in response to rotation of the shaft through a second portion of the first arc.

Preferably, at least one switch provides the oven controller with a control input signifying an OFF/CANCEL function. In this embodiment, this switch carries a reliability sufficiently high such that a redundant first terminal is not required on the potentiometer. Alternatively, two switches provide the oven controller with control inputs signifying the OFF/CANCEL function. In this embodiment, the cam actuates both of the switches at a given angular position. Each of these two switches carries a reliability sufficiently high such that a combined reliability of both switches is sufficiently high to eliminate the need for a redundant first terminal on the potentiometer. Alternatively, the potentiometer includes a redundant first terminal.

Therefore, in an appliance such as an oven for cooking food, the invention contemplates a user rotatable, single knob oven control device which provides both discrete and continuous control signals to the appliance controller. The discrete outputs indicate selection of oven features, and the continuous output the desired baking temperature. These inputs are selected by a user in response to rotation of a user interface knob mounted on a control panel. The control panel provides visual indication of oven cooking temperature selections through a first arc around the knob, and user selectable oven features (such as, e.g., OFF/CANCEL, BROIL, and CLEAN) in a second arc around the knob. The control device comprises a hub having a portion adapted to be drivably coupled to the user interface knob. The hub also includes a flange which has at least one cam. The device also includes a variable resistance element having a rotatable shaft in driving engagement with the hub. This element provides a variable resistance output in response to rotation of the shaft through the first arc. Additionally, the device includes a push button switch which is located external to the variable resistance element. The switch is also located in proximity with the flange such that rotation of the hub will bring the cam in contact with the switch to actuate it. This switch provides a discrete output when actuated by the cam to indicate a selection of one of the oven features.

These and other aims, objectives, and features of the invention will become more apparent from the following detailed description when taken in conjunction with the accompanying drawings.

Figure 1:
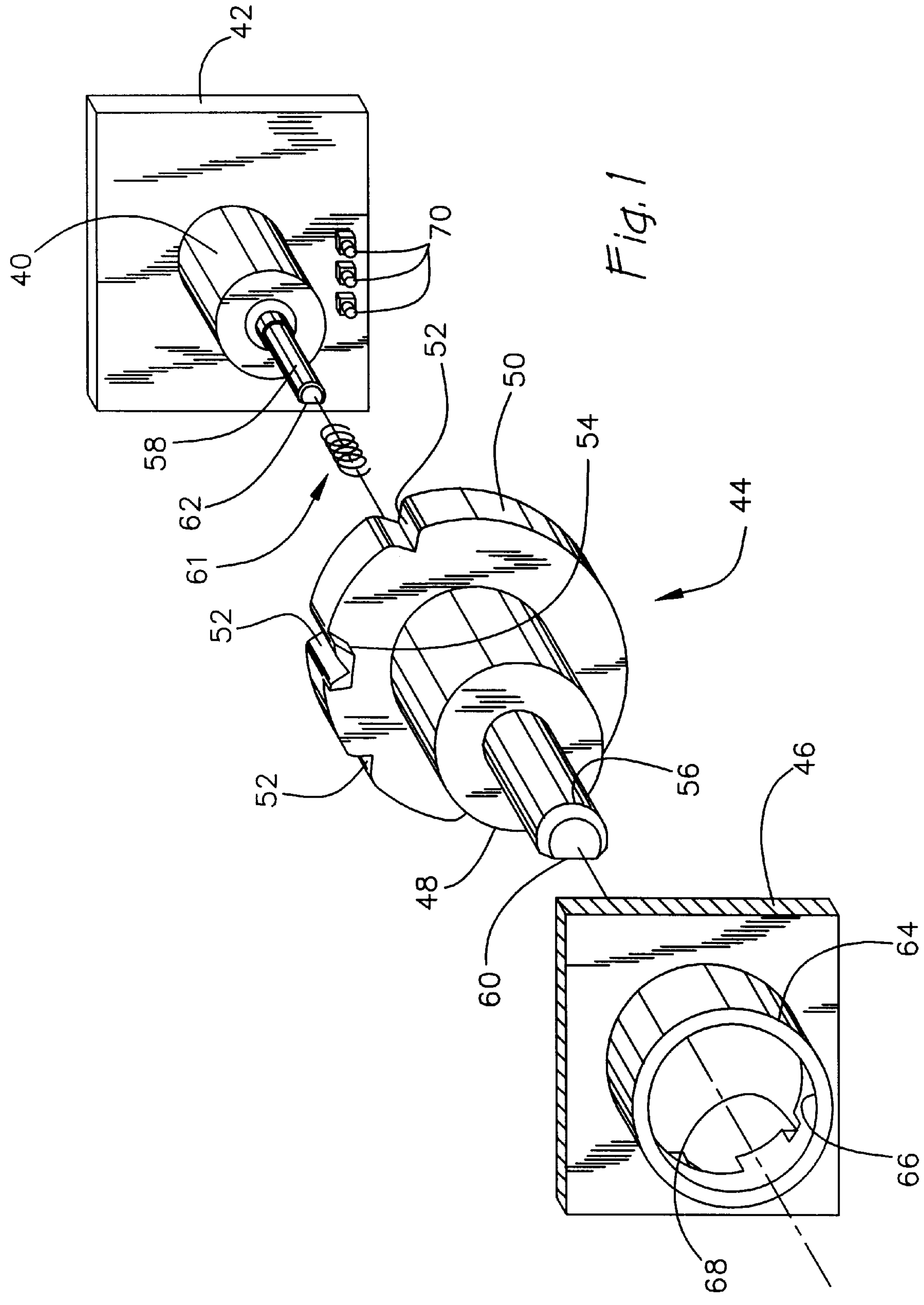
FIG. 1 is an exploded isometric view of an embodiment of the instant invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

A preferred embodiment of the instant invention is illustrated in exploded isometric form in FIG. 1. As may be seen, a preferred embodiment of the instant invention utilizes a standard, commercially available potentiometer 40 which may be mounted on a circuit board 42 or other appropriate member for positioning the potentiometer in the correct location to be accessible through the panel mounted control knob (not shown). A preferred embodiment also includes a hub 44 which protrudes through and interacts with a cover 46 to allow user actuation and selection of the various oven features. The hub 44 has an enlarged diameter portion 48 which has a generally hollow cylindrical configuration open at one end with an annular outwardly extending flange 50 formed at the open end thereof. The flange 50 includes a plurality of notches or recesses 52 formed therein spaced about the periphery thereof. One of the recesses 52 is formed through an axially extending projection 54 extending from one axial face of the flange 50 and corresponds to the OFF position of the control knob. Hub 44 has a reduced diameter portion 56 which has a hollow cylindrical configuration and is adapted to be axially assembled over the shaft 58 of the potentiometer 40 and closely fitting driving engagement therewith. The hub 44 is biased to slide in an axially outward direction or a direction tending to separate the hub and the potentiometer by the spring action of the shaft 58 of the potentiometer 40, or alternately by a coil spring 61 nested in the interior of the enlarged diameter portion 48. Hub portion 56 has a flat portion extending therealong denoted by reference numeral 60, and is thus configured to engage the flattened portion 62 of the potentiometer shaft 58 in sliding engagement and is effective for torque transmission therebetween.

Cover 46 has an annular collar or projection 64 extending from the face thereof and having hub 44 journaled therein on the inter-periphery 66 of the collar 64 for free rotation and axially sliding movement therein. The axial projections 54 of hub 44 require a substantial movement by the user of the hub 44 in the axial direction towards the potentiometer 40 to disengage the projections 54 from the notches 68 to permit rotation of the hub 44 from the position corresponding to the projection 54. Thus, the rotational position of the hub 44 and the potentiometer shaft 58 correspond to the engagement of the projections 54 with the notches 68, and may correspond to the "OFF" position for the potentiometer 40 requiring axial movement of or pushing of the hub 44 by the user in order to permit rotary movement of the hub 44 and potentiometer shaft 58 from the "OFF" position. It may be understood that an unshown user knob is engaged over the reduced diameter portion 56 of the hub 44 to facilitate user movement thereof.

Figure 2:
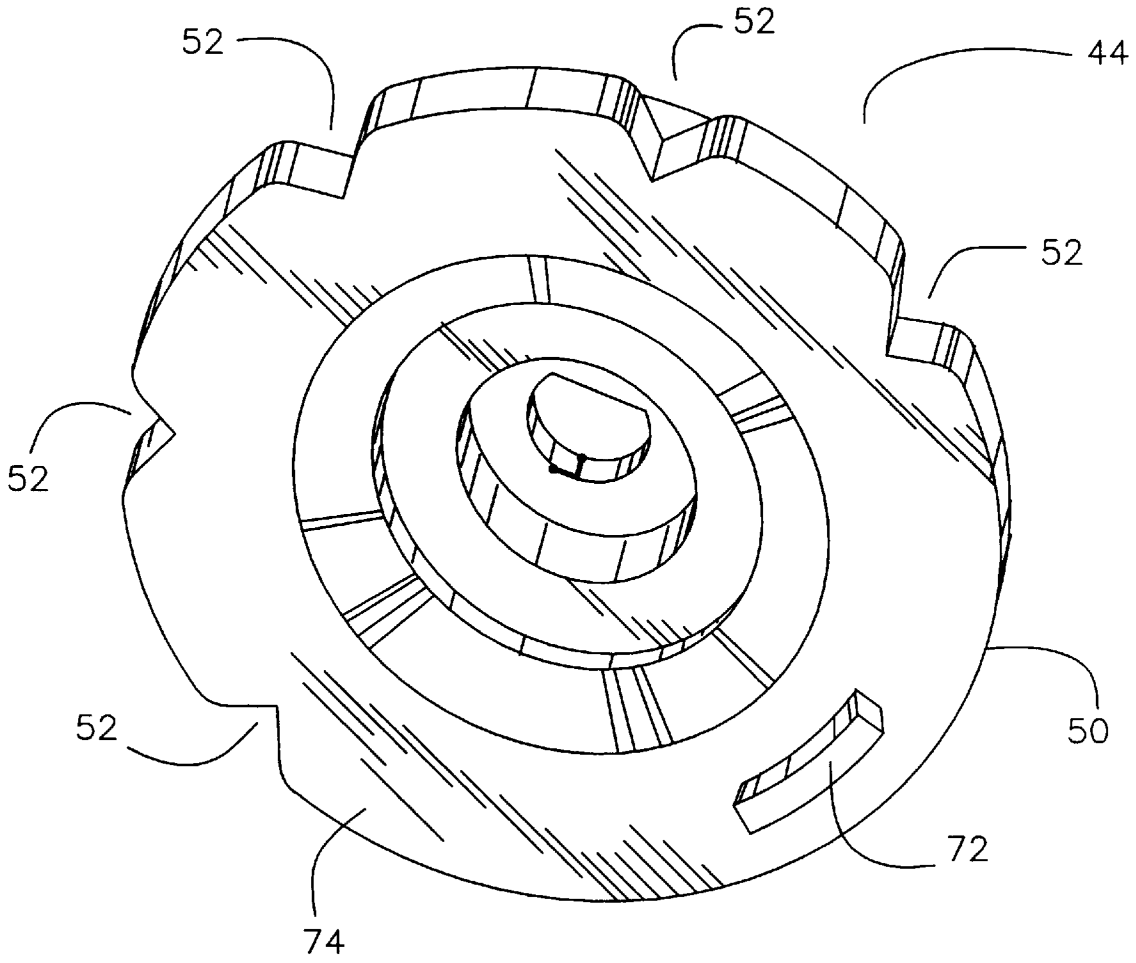
FIG. 2 is an isometric view illustrating in greater detail an aspect of the instant invention.

It may also be seen that the circuit board 42 or other appropriate mounting structure also includes a plurality of discrete push button switches 70 which are positioned in radial angular relationship to the potentiometer 40. These individual discrete switches 70 are actuated by a cam 72 (see FIG. 2) which is mounted on the underside 74 of the annular outwardly extending flange 50. As will be described more fully hereinbelow, the angular placement of the discrete switches 70 on mounting structure 42, and of the cam 72 on the hub 44 allows for actuation of each of the plurality of discrete switches 70 by the cam 72 when the notches or detents 52 are positioned to the OFF, CLEAN, and BROIL positions. One skilled in the art will recognize that more or fewer discrete switches 70 may be included as more or fewer features are required. As more features are added, additional detents 52 may also be added to the rotor hub 50 to allow for a positive tactile acknowledgment of the selection of each of these features. Preferably, the discrete actuation switches 70 for the additional features will be located within a given angular arc of the potentiometer 40, as will be described more fully hereinbelow, so as to not reduce the useful angular area of the potentiometer. As will be recognized by one skilled in the art, these additional discrete switches 70 may need to be radially as well as angularly offset from the switches 70 illustrated in FIG. 1. In which case, the hub 44 would include multiple cams on the underside 74 of the flange 50 to ensure only single switch actuation in any given position.

Figure 3:
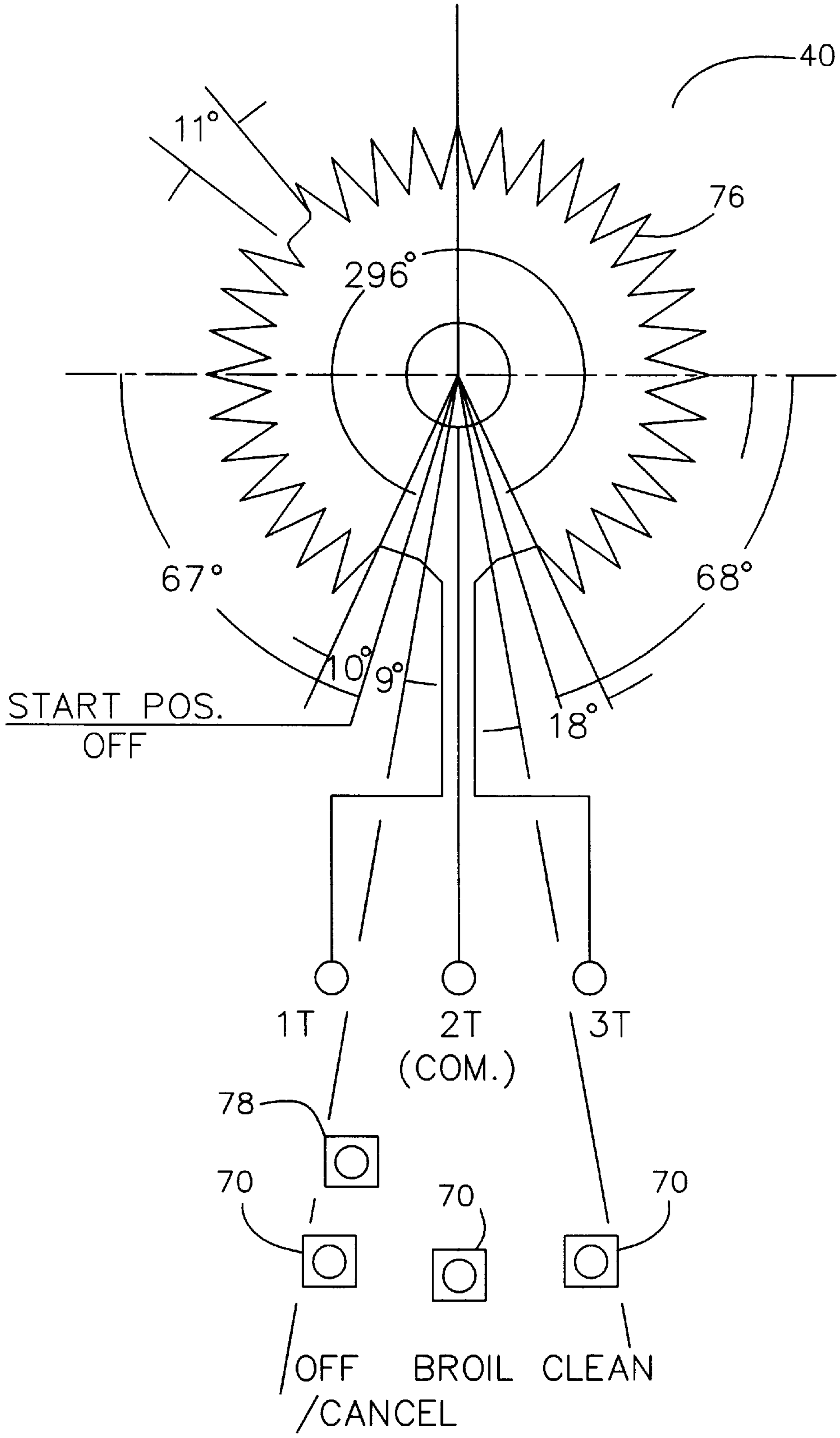
FIG. 3 is a schematic illustration of an embodiment of the instant invention.

A distinct advantage of the instant invention is recognized upon examination of FIG. 3. Specifically, as may be seen from this figure, potentiometer 40 may of conventional commercially available design, including solely a variable resistance 76 which traverses a first arc within the potentiometer 40 defined by an angle approaching 300°–310°. The particular embodiment illustrated in FIG. 3 includes an arc of variable resistance 76 traversing approximately 296°. Advantageously, nearly this entire arc may be utilized in the temperature selection for the oven control. This allows for greatly enhanced accuracy as the resistance change per resulting temperature change is much greater than has heretofore been possible with the inclusion of such feature selection. As with previous oven controls, an approximate 20° arc is provided from the bake temperature variable resistance 76 to the first and last discrete switch 70 to eliminate the possibility of having two functions selected at any one time. Therefore, allowing for full utilization of the variable resistance 76 over an arc of 296°, as well as an acceptable separation arc on either end of the variable resistance 76, an arc of approximately 25°–30° remains for placement of the discretely actuated switches 70.

Adequate spacing between the discretely operated switches 70 may be ensured by placing them radially outward from the center of the potentiometer 40. The particular placement of the discretely operated switches 70 is dependent only on the size of cam 72 (see FIG. 2). That is to say, the discretely operated switches 70 must be placed far enough apart such that the cam 72 may only actuate a single switch at any given angular position. Additionally, the switches 70 must be placed and the cam 72 must be sized such that no switch is actuated for rotary transitions from one switch to another. As discussed above, as more functions are added, additional switches 70 may be placed within the 25°–30° arc so that the range of variable resistance 76 is not encroached upon, which would otherwise reduce the useable angular area of the variable resistance. These switches may be placed at differing radial distances from the center of potentiometer 40 at different angular positions, or may be placed at the same radial distance from the center of the potentiometer 40 so long as this radial distance allows for adequate spacing between each of the switches to ensure only single switch actuation at any angular position of the hub 44. As will be recognized by one skilled in the art, if the switches are to be maintained at a common radial distance from the center of the potentiometer 40, the circumference of the flange 50 will need to be increased so that cam 72 may actuate each of the switches within the given arc. Further, as will also be recognized by one skilled in the art, if the switches are to be placed at differing radial positions within the given arc, additional cams will need to be placed on the underside 74 of flange 50 to ensure proper actuation of the proper switch at a given angular position of the hub 44.

The embodiment of the instant invention illustrated in FIG. 3, as stated above, utilizes a commercially available potentiometer 40 which has a variable resistance traversing an arc of approximately 296°. This standard commercially available potentiometer includes three terminals, 1T, 2T, 3T. While such potentiometers are available at a cost and with a reliability which make them highly desirable for such applications, there use has heretofore been excluded from oven controls because of the safety requirements placed on the controls. Specifically, the oven temperature control is required to include a redundant ground for the OFF/CANCEL position of the control dial. This is to ensure that a single wire failure will not cause the oven to turn on or overheat. However, the inventors of the instant invention recognized that the reliability of the discretely operated switches approached or exceeded that of a redundant ground wire. Therefore, through proper selection of a highly reliable discretely operated switch depending on the system reliability requirements, the inventors were able to satisfy all of the safety requirements and still utilize an inexpensive, highly reliable, commercially available potentiometer 40 which has heretofore not been possible to utilize in this application.

An alternate embodiment of the instant invention may include a second discretely operated switch 78 at the angular position corresponding to the OFF/CANCEL function to provide enhanced reliability of the OFF/CANCEL position. As will be recognized by one skilled in the art, these two switches in the OFF/CANCEL angular position may be actuated by a single cam 72 whose radial width is sufficient to actuate both switches, or may be actuated by a second cam positioned at the appropriate radial distance from the center of the hub 44.

Figure 4:
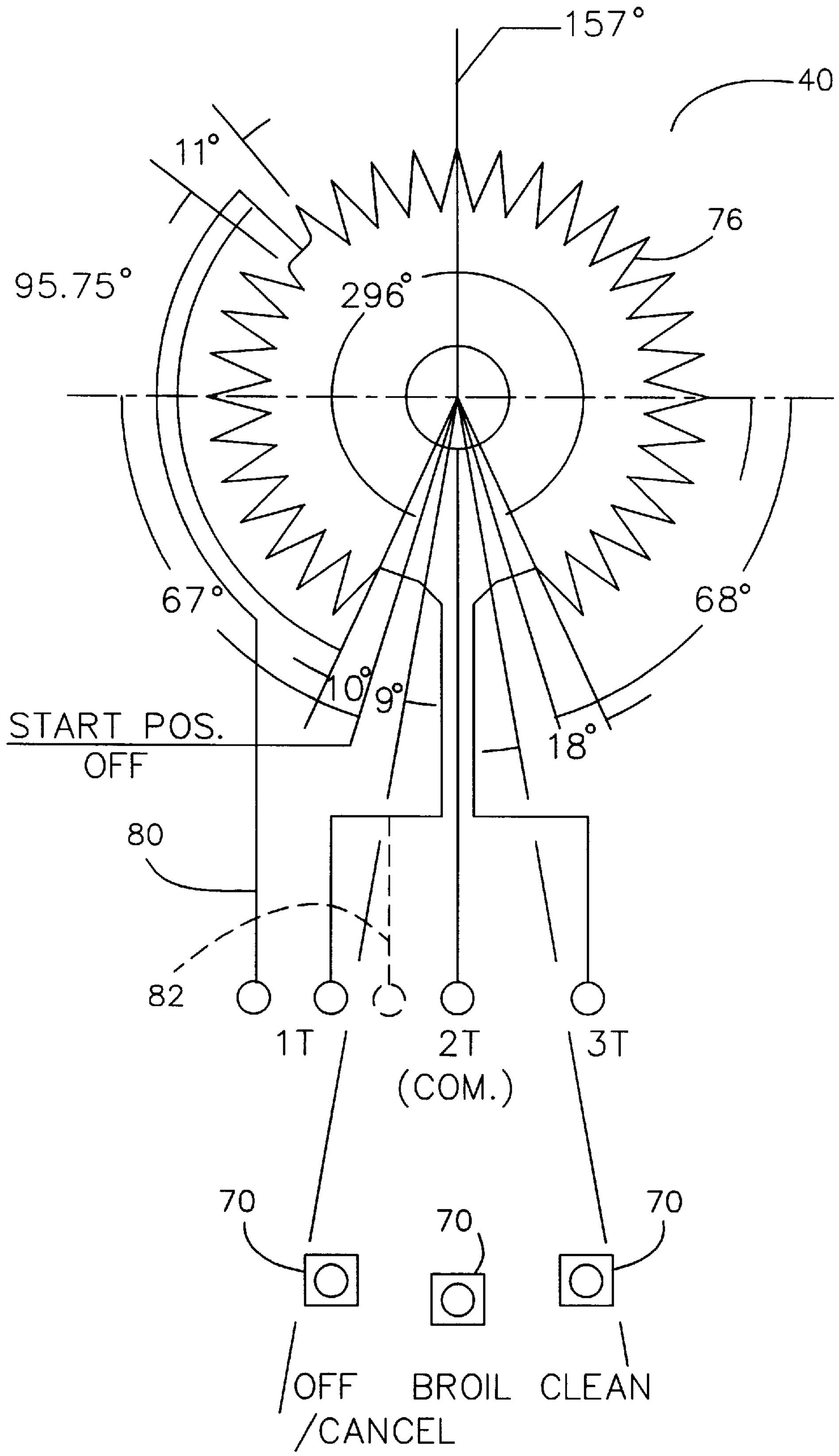
FIG. 4 is a schematic illustration of an alternate embodiment of the instant invention.
Figure 5:
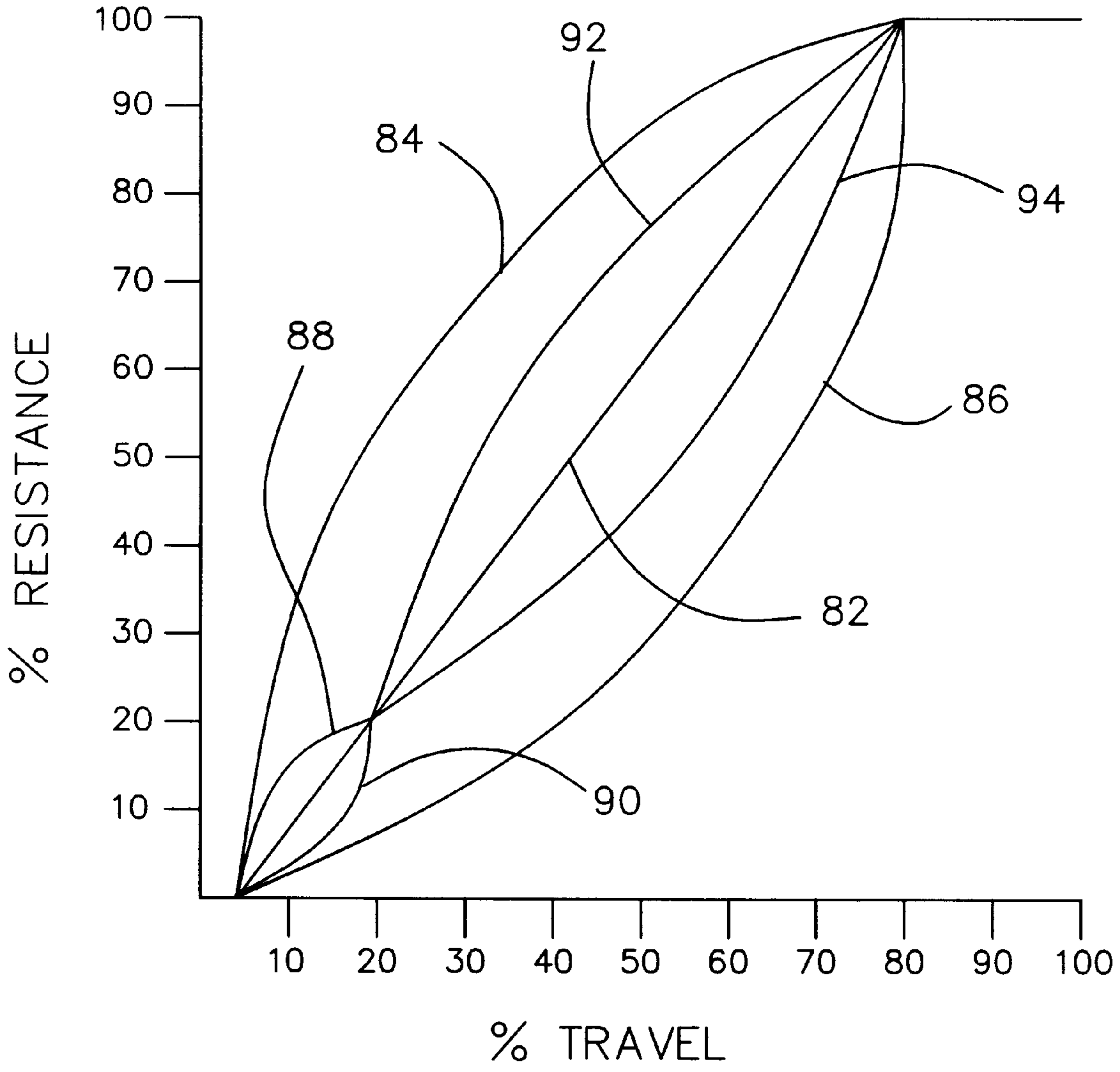
FIG. 5 is a graphical representation illustrating aspects of embodiments of the instant invention.
Figure 6:
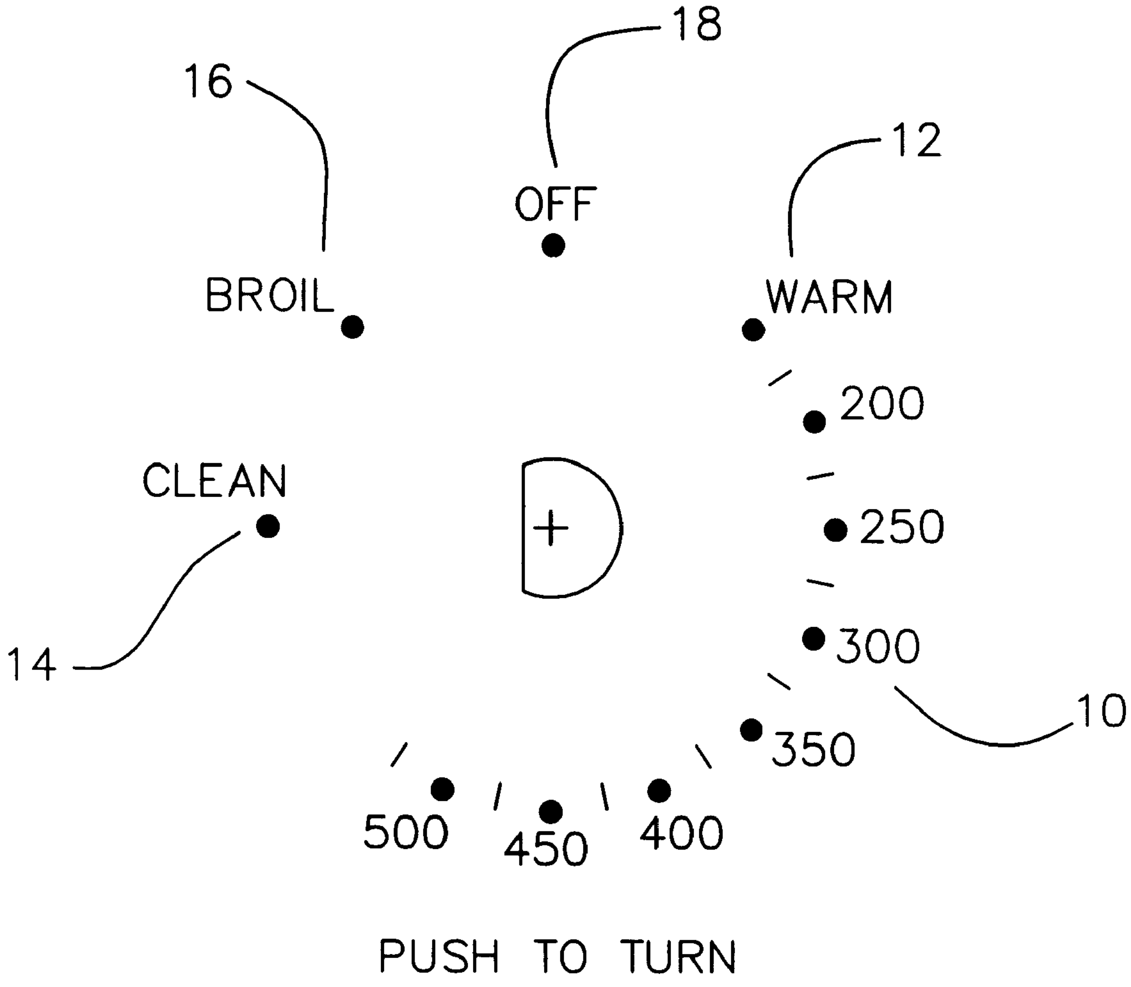
Fig. 6 (PRIOR ART)
FIG. 6 is a pictorial representation of a prior art of a front panel control screen.
Figure 7:
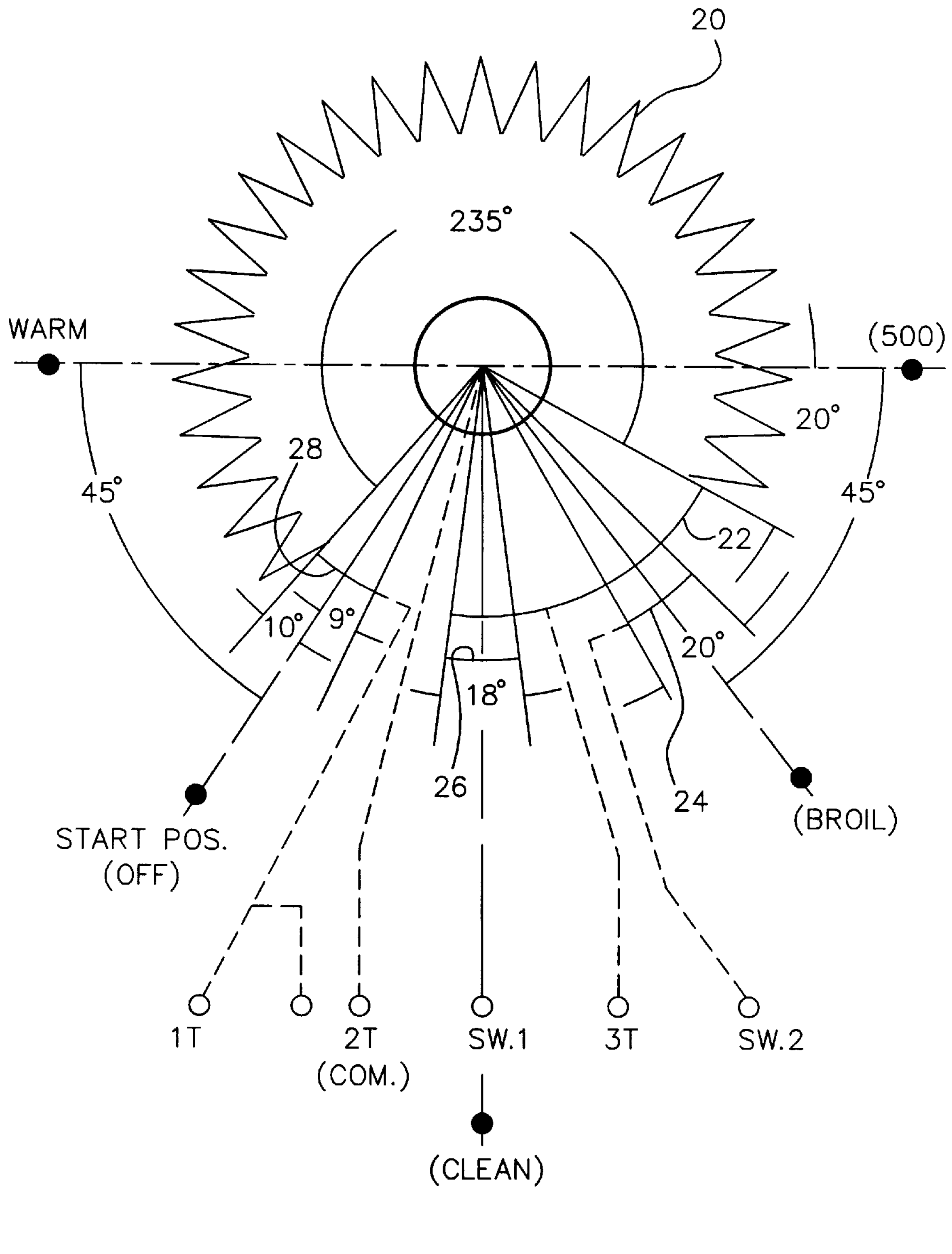
Fig. 7 (PRIOR ART)
FIG. 7 is a schematic illustration of a prior art electronic control knob for an oven.
Figure 8:
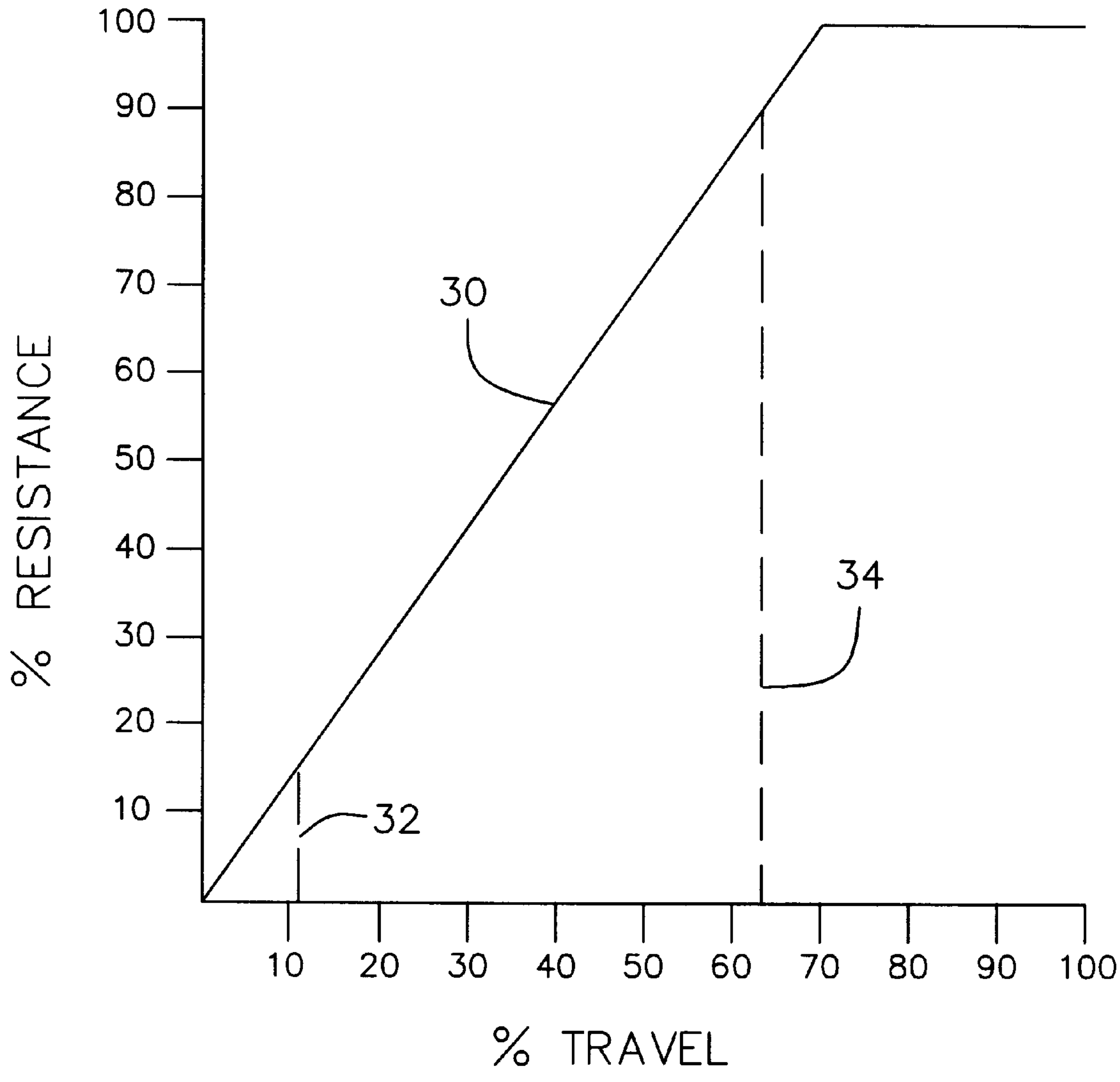
Fig. 8 (PRIOR ART)
FIG. 8 is a graphical representation of the useful resistance change of the control knob illustrated in FIG. 7.
Figure 9:
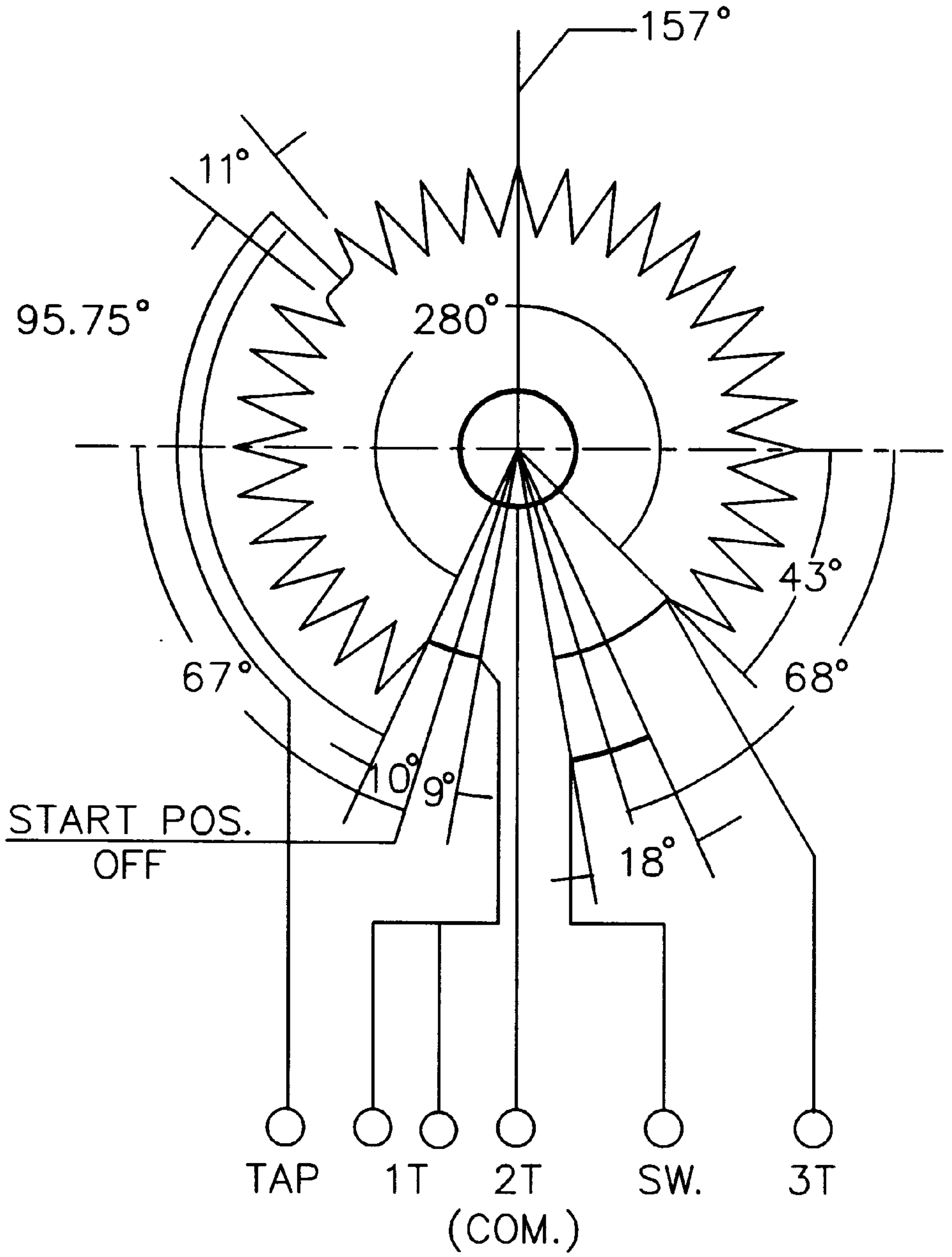
Fig. 9 (PRIOR ART)
FIG. 9 is a schematic illustration of a second generation prior art electronic control knob for an oven.
Figure 10:
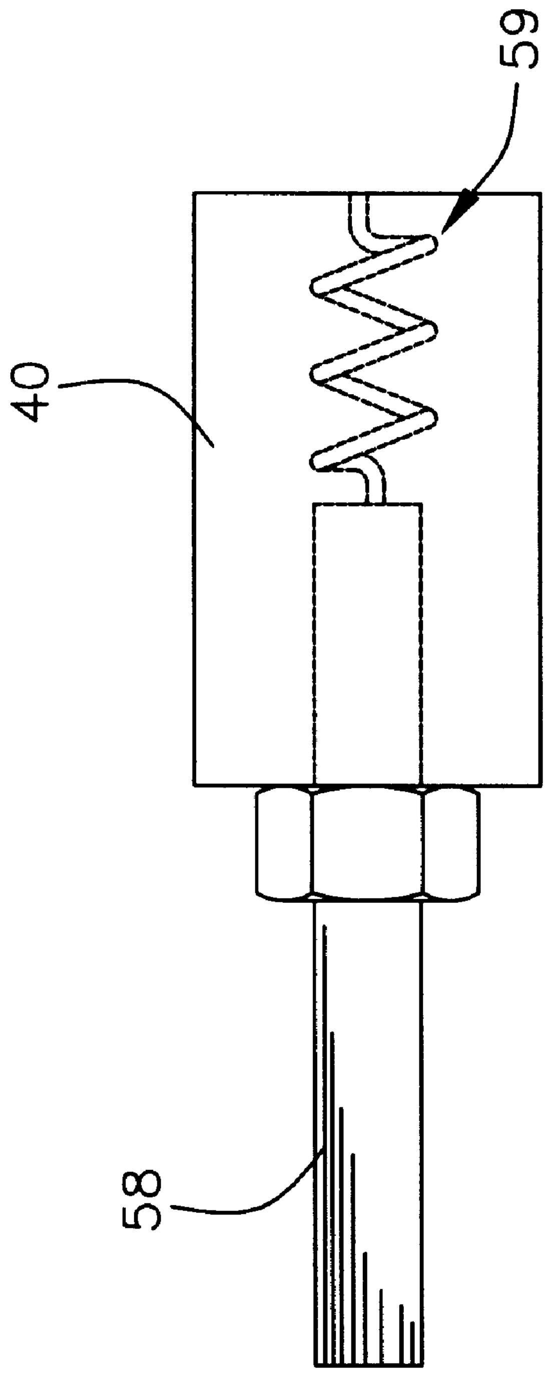
FIG. 10 is a graphical representation illustrating aspects of an embodiment of the instant invention.

An alternate embodiment of the instant invention is illustrated in FIG. 4 to which specific reference is now made. As may be seen from this figure, a center tap 80 has been added to the variable resistance 76 of potentiometer 40 as has a redundant ground 82. This center tap 80 improves the linear accuracy of the variable resistance 76 as read by the oven controller (not shown), and eliminates the necessity of calibrating the potentiometer to ensure proper temperature selection. The operation of this tap 80 may be better understood with reference to the graph of FIG. 5. As may be seen from this graphical representation, an idealized linear resistance change over the entire arc of the potentiometer 40 illustrated in FIG. 4 is represented by the straight line 82. However, most reasonably priced, commercially available potentiometers have a resistance tolerance band having an upper 84 and a lower 86 limit. Recognizing that the resistance variation over the entire arc is not necessarily linear, a calibration step is typically performed at the factory to ensure that the oven controller (not shown) correlates a given resistance measurement corresponding to a particular angular position of the control knob with a proper temperature set point. To reduce the need for such calibration steps at the factory, the center tap 80 is utilized to provide a third known point of resistance so that the tolerance variation between any two of the three known points is much less than without the center tap 80. That is to say, the upper tolerance 88 and the lower tolerance 90 of the variation of resistance from terminal 1T to the terminal TAP, and the upper tolerance 92 and the lower tolerance 94 of the variation of resistance from terminals TAP to terminal 3T is as illustrated in FIG. 5. As may be recognized, the new tolerance levels 88, 90 and 92, 94 are much less than the resistance tolerance defined by limits 84, 86 without the tap 80. The particular placement of tap 80 along the arc of variable resistance 76 is not critical, although it is preferably placed in a region corresponding to cooking temperatures of foods which are particularly sensitive to variations in the cooking temperature. That is to say, the tap 80 is preferably placed in a region corresponding to increased criticality of the accuracy of the selected baking temperature.

The present invention thus provides a push to turn actuation of a user control input to affect all electrical control of oven fuel gas burners and provides for automatic regulation of the oven temperature thereafter. The invention further allows utilization of inexpensive commercially available potentiometers which allow for a useful angle of rotation of the variable resistance from approximately 300°–310°. Safety requirements may be met through the inclusion of appropriate discretely operated external switches, and proper selection of oven features may be ensured through the inclusion of rotor detents at the appropriate angular position.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure and implementation of the various components described above can be varied substantially without departing from the spirit of the invention, and the exclusive use of all modifications that come within the scope of the appended claims is reserved.

What is claimed is:

1. An oven control apparatus providing control inputs to an oven controller, the control inputs including temperature and oven feature selections, comprising:

a potentiometer having a shaft and at least a first and a second output terminal, said potentiometer providing a variable resistance between said first and said second output terminal in response to a rotation of said shaft through a first arc, said variable resistance forming the temperature selection control input;

at least one push button switch positioned radially external to said potentiometer and outside said first arc; and a hub having a flange and a first portion in driving engagement with said shaft, said flange having at least one cam positioned thereon to actuate said at least one switch upon rotation of said shaft at an angular position outside said first arc, said at least one push button switch forming the oven feature control input.

2. The apparatus of claim 1, wherein said first arc is defined by an angle greater than 280 degrees.

3. The apparatus of claim 2, wherein said first arc is defined by an angle in the range of 290 to 310 degrees.

4. The apparatus of claim 1, wherein all of said switches are positioned within a second arc defined by an angle of less than approximately 60 degrees +/−10 degrees.

5. The apparatus of claim 4, wherein said second arc is defined by an angle of less than approximately 30 degrees.

6. The apparatus of claim 1, wherein said potentiometer further comprises a tap terminal electrically coupled between said first and said second terminals such that said potentiometer provides a first variable resistance between said first terminal and said tap terminal in response to rotation of said shaft through a first portion of said first arc, and said potentiometer provides a second variable resistance between said tap terminal and said second terminal in response to rotation of said shaft through a second portion of said first arc.

7. The apparatus of claim 1, wherein said at least one push button switch provides a control output signifying an OFF/CANCEL function, and wherein said at least one push button switch carries a reliability sufficiently high such that a redundant first terminal is not required.

8. An oven control apparatus providing control inputs to an oven controller, the control inputs including temperature and oven feature selections, comprising:

a potentiometer having a shaft and at least a first and a second output terminal, said potentiometer providing a variable resistance between said first and said second output terminal in response to a rotation of said shaft through a first arc, said variable resistance forming the temperature selection control input, at least one switch positioned radially external to said potentiometer and outside said first arc;

a hub having a flange and a first portion in driving engagement with said shaft, said flange having at least one cam positioned thereon to actuate said at least one switch upon rotation of said shaft at an angular position outside said first arc, said at least one push button switch forming the oven feature control input;

a cover having an annular collar accommodating said hub therethrough, said annular collar having formed therein a notch; and wherein said flange has formed on an outer periphery thereof at least one detent, said detent being angularly positioned such that upon rotary engagement with said notch, said cam is positioned to actuate said switch.

9. The apparatus of claim 8, further comprising at least two switches positioned radially external to said potentiometer and outside said first arc; and wherein said at least one cam is positioned to actuate each of said at least two switches upon rotation of said shaft at a first and a second angular position outside said first arc.

10. The apparatus of claim 9, wherein said flange has formed therein at least two detents, each of said detents being angularly positioned such that upon rotary engagement of each detent with said notch said at least one cam is positioned to actuate one of said at least two switches.

11. The apparatus of claim 9, wherein said at least two switches are displaced one from another such that only one of said switches is actuated at any time by said at least one cam.

12. The apparatus of claim 9, wherein said at least two switches are radially displaced one from another.

13. The apparatus of claim 12, wherein said cam actuates both of said switches.

14. The apparatus of claim 13, further comprising at least two cams positioned on said flange and radially displaced one from another in proportion to said radial spacing of said at least two switches such that a first cam actuates a first switch, and a second cam actuates a second switch.

15. The apparatus of claim 8, wherein said flange further comprises an axially extending projection which engages said notch to prevent rotation of said hub;

wherein said shaft is outwardly spring biased to force said axially extending projection to engage said notch; and wherein said shaft may be inwardly forced to disengage said axially extending projection from said notch to allow rotation of said hub.

16. The apparatus of claim 8, further comprising a coil spring interposed between said potentiometer and said hub, said spring outwardly biasing said hub; and wherein said flange further comprises an axially extending projection, said spring forcing said axially extending projection to engage said notch thereby preventing rotation of said hub; and wherein said hub may be inwardly forced to compress said spring and to disengage said axially extending projection from said notch to allow rotation of said hub.

17. The apparatus of claim 8 wherein said switches are discrete push button type switches.

18. The apparatus of claim 8, wherein both of said at least two switches provide control outputs signifying an OFF/CANCEL function, wherein said at least one cam actuates both of said switches at a given angular position, and wherein each of said at least two switches carries a reliability sufficiently high such that a combined reliability of both switches is sufficiently high such that a redundant first terminal is not required.

19. The apparatus of claim 8, wherein said potentiometer further comprises a redundant first terminal.

20. An oven control apparatus providing control inputs to an oven controller, the control inputs including temperature and oven feature selections, comprising:

a potentiometer adapted to provide temperature control input to an oven controller, said potentiometer having a shaft and at least a first and a second output terminal, said potentiometer providing a variable resistance between said first and said second output terminal in response to a rotation of said shaft through a first arc;

at least one push button switch adapted to provide oven feature selection input to an oven controller, said at least one switch positioned radially external to said potentiometer and axially outside said first arc;

a hub having a flange and a first portion in driving engagement with said shaft, said flange having at least one cam positioned thereon to actuate said at least one switch upon rotation of said shaft at an angular position outside said first arc;

at least three switches positioned radially external to said potentiometer and within a second arc, said second arc defined by an angle of less than approximately 60 degrees +/−10 degrees; and wherein said at least one cam is positioned to actuate each of said at least three switches upon rotation of said shaft at a first, a second, and a third angular position within said second arc.

21. In an appliance having an oven compartment for cooking food and an appliance controller that controls the oven compartment for cooking food, an oven control device providing both discrete and continuous control signals to the appliance controller in response to rotation of a user rotatable knob mounted on a user accessible control panel, the discrete control signal indicating user selectable oven feature selection and the continuous control signal indicating desired baking temperature, the user accessible control panel providing indication of baking temperature through a first arc around the user rotatable knob and user selectable oven features through a second arc around the user rotatable knob exclusive of the first arc, the oven control device comprising:

a hub having a portion adapted to be drivably coupled to the user rotatable knob and a flange, said flange having at least one cam formed thereon;

a variable resistance element having a rotatable shaft in driving engagement with said portion of said hub, said element providing a variable resistance output in response to rotation of said shaft through the first arc, said variable resistance output forming the continuous control signal;

at least one push button switch external to said variable resistance element and in proximity with flange such that rotation of said hub will bring said cam in actuatable contact with said switch, said switch providing the discrete control signal in response to said actuation by said cam.

22. The device of claim 21, further comprising:

a mounting collar interposed between the user interface knob and said hub, said collar including a projection; and wherein said flange further comprises a detent formed therein, said detent interacting with said projection upon rotation of said hub, said interaction providing a tactile indication of rotational position.

23. The device of claim 22, wherein said flange further comprises an axially extending portion, wherein said collar further comprises at least one notch formed therein, and wherein said axially extending portion engages said notch at a given rotational position to inhibit further rotation of said hub.

24. The device of claim 23, wherein said hub is axially biased to allow said axially extending portion to engage said notch at a given rotational position, and wherein said hub is axially translatable to disengage said axially extending portion from said notch to allow rotation of said hub.

25. A control assembly, comprising:

a potentiometer having a rotatable control shaft extending therefrom, said potentiometer providing a variable resistance output in response to rotation of a shaft through a first arc;

at least a first and a second switch mounted external to said potentiometer, said first switch providing a first discrete output upon actuation, said second switch providing a second discrete output upon actuation;

a hub having a first portion in rotatably driving engagement with said shaft, said hub including a flange having a cam formed thereon, said cam being radially positioned and axially extending such that rotation of said hub will bring said cam in actuatable engagement with said switches, said engagement with said first switch occurring at a first rotary position and said engagement with said second switch occurring at a second rotary position, said first and said second rotary positions being outside said first arc.

* * * * *